tates Patent Office 3,106,539
Patented Oct. 8, 1963

3,106,539
STABILIZED VINYL RESIN COMPOSITIONS
John G. Hendricks, Boonton, and Abb L. Scarbrough, Rahway, N.J., assignors to National Lead Company, New York, N.Y., a corporation of New Jersey
No Drawing. Filed Dec. 2, 1959, Ser. No. 856,649
15 Claims. (Cl. 260—23)

This invention relates to vinyl resin compositions and, more particularly, to stabilizers for such compositions to improve their resistance to the action of light and heat.

Vinyl resin compositions are sensitive to the action of light and heat and the acid degradation products produced by such action react to effect deterioration of the resin composition. This deterioration, primarily evidenced by color changes which, in themselves, are undesirable, seriously affects flexibility and tensile strength as well as other physical characteristics of the resin. Since the resin compositions are exposed to heat during compounding and processing and to light during ordinary use, it is customary to incorporate agents in the resin composition which tend to stabilize the physical properties.

Basic lead salts of various kinds have heretofore been employed as stabilizing agents for vinyl resin compositions. Among such basic lead salts may be mentioned, among others, dibasic lead phthalate, dibasic lead phosphite, basic carbonate white lead, basic silicate white lead, and tribasic lead sulfate. While such basic lead salts have been successful as stabilizing agents and have gained wide use for this purpose, they nevertheless do not, nor does any stabilizer, confer complete immunity to light and heat. Hence, there exists a continuing demand for improved stabilizers.

An object of this invention is to provide improved vinyl halide resin compositions stabilized against the effects of light and heat.

Another object of this invention is to provide stabilized vinyl halide compositions in which the stabilizer possesses improved inertness toward organic colorants and plasticizers.

A still further object of the invention is to provide stabilized vinyl resin compositions having improved electrical resistivity.

A still further object is to provide stabilized vinyl resin compositions which may be economically manufactured and sold.

These and other objects of the invention will be apparent from the following description of embodiments of the invention.

In addition to the use of heat and light stabilizers in the vinyl resin compositions, it has been the practice, in the past, to add lubricants to vinyl resin compositions to improve the moldability and workability of the composition. Such lubricants have been added in relatively small quantities to attain the desired properties in molding and working the composition without imparting excess lubricity to the completed article. One such lubricant which has been employed with vinyl resin compositions is barium stearate.

Through this invention it has been discovered that barium stearate, when added in certain proportions to a basic lead salt of an inorganic, oxygen-containing acid, substantially improves the heat and light stability of vinyl resin compositions and, at the same time, substantially improves the electrical resistivity of vinyl resin compositions. More specifically, it has been discovered that a barium salt of a fatty acid, containing from 6 to 20 carbon atoms, when added in the proportion of not substantially less than 1% and not substantially more than 40% by weight, based on the lead oxide content of the stabilizer, substantially improves the heat and light stability of vinyl resin compositions.

According to the invention, it has been discovered that when a barium salt of a fatty acid, containing from 6 to 20 carbon atoms, for example, barium stearate, is added to a basic lead salt, in proportions within the stated range, a substantial improvement in heat and light stability results. Hence, insofar as this invention is concerned, the proportion of barium stearate with respect to the lead oxide content of the lead salt in critical. When used in proportions within the stated range, the barium stearate and basic lead salt coact to give a degree of stabilization markedly in excess of that obtained with basic lead salts alone or with basic lead salt and barium stearate where the proportion is outside of the range stated.

The stabilizer components may be added to the resin batch separately or together and may be introduced at any desired stage of manufacture, but it is preferable to add them both before or during the milling operation or in the initial mixing of the ingredients of the resin batch. It has been found that both the barium stearate and the basic lead salt disperse readily in the mixture of vinyl resin and other compounding agents so that a uniform dispersion is easily obtained. After mixing, the ingredients are fluxed and homogenized on a mill at conventional temperatures.

The stabilizer, that is, the mixture of basic lead salt and the barium stearate, should preferably be present in a total amount between approximately 0.05 and 20% by weight of the polymer. Amounts lower than 0.05%, although they exhibit some beneficial effect, do not in general exert sufficient stabilizing action to provide a commercially acceptable product, unless other stabilizers are used in conjunction therewith. Amounts in excess of 20%, on the other hand, are not ordinarily desirable, as they merely load the resin with large amounts of solids without serving any additional stabilizing purpose. Within the stated range, optimum results are usually obtained using amounts of barium stearate and basic lead salt which total between 2 and 7%, based on the weight of the polymer.

Various samples of vinyl plastic compositions were prepared and samples were tested wherein the basic lead salt stabilizer was used alone, the barium stearate was used alone and the blends of the basic lead salt and barium stearate, in varying proportions were tested. These samples were milled into sheets and exposed to heat in a forced circulation type oven. The samples were visually examined and the stabilizer systems evaluated, employing changes in color as the criterion of degradation. Electrical resistivity measurements were taken at 70° C. On certain of the specimens, after conditioning in an oven at 70° C. for 30 minutes, insofar as the heat stability tests were concerned, the samples were evaluated on appearance and graded from extremely poor to extremely good. A marked improvement was evident in these tests when barium stearate was added to the basic lead salt stabilizer in proportions of from 1% to 40% of the total stabilizer, based on the lead oxide in the stabilizer.

The invention will be further illustrated by detailed description in connection with the following specific examples of the practice of it. In these examples and elsewhere herein, proportions are expressed as parts by weight.

EXAMPLE 1

100 parts of polyvinyl chloride resin were mixed with 50 parts of dioctyl phthalate plasticizer, and varying amounts of stabilizer were added to the composition. Mixing and fluxing was achieved in a four minute cycle on a two roll mill of the conventional type heated to a temperature of 300° F. Portions of the plastic combination were removed from the mill in the form of sheets of 0.020 inch and 0.040 inch thickness. Comparative tests of the heat stability of these vinyl plastic combinations were made by exposing the samples to the effect of 375° F. and 400° F. temperature in a forced circulation oven for intervals of 5, 10, 15, 20 and 25 minutes. The heat exposed samples were examined visibly and the stabilizer systems evaluated employing changes in color as the criterion of degradation.

Electrical volume resistivity measurements were taken at 70° C. on specimens of the 20 mil film after conditioning in an oven at 70° C. for 30 minutes. The results of these heat stability and electrical resistivity tests are given in Table I.

*Table I*

HEAT STABILITY AND ELECTRICAL PROPERTIES OF VINYL PLASTIC COMPOSITIONS

| Stabilizer | Parts | Parts Ba stearate | Heat stability | Volume resistivity at 70°C. | |
|---|---|---|---|---|---|
| | | | | $10^{12}$ ohm-cm. | Percent of control |
| Lead chlorosilicate | 5 | 0 | VP | 2.8 | Control |
| | 4 | 1 | F | 6.9 | 246 |
| Hydrous tribasic lead sulfate. | 5 | 0 | P | 4.6 | Control |
| | 4 | 1 | G− | 6.5 | 141 |
| Basic lead silicate-sulfate. | 5 | 0 | VP | 3.8 | Control |
| | 4 | 1 | F− | 6.7 | 176 |
| Dibasic lead phosphite. | 5 | 0 | G− | 3.6 | Control |
| | 4.5 | 0.5 | VG | 5.2 | 145 |

In the above examples, the "parts" are parts by weight per 100 parts by weight of resin. The heat stability values are expressed in terms of visual appearance of the samples after heating for 25 minutes at 400° F. In this table and in the other tables, the symbols have the following significance:

EP = Extremely poor
VP = Very poor
P = Poor
F = Fair
G = Good
VG = Very good
EG = Extremely good Where minus signs are indicated after any of the above symbols, the minus sign indicates that the appearance of the sample was poorer than the symbol itself would indicate but not sufficiently so to make the next lower symbol applicable.

EXAMPLE 2

100 parts of polyvinyl chloride resin were mixed with 50 parts of dioctyl phthalate plasticizer, 3 parts of titanium dioxide, 0.025 part of lithol rubine red pigment, 0.5 part petroleum wax and 5 parts of dibasic lead phosphite. A similar composition was prepared except that 0.5 part barium stearate was substituted for the 0.5 part petroleum wax lubricant. A third composition containing the same ingredients as in the first composition except that lead orthosilcate was employed in place of the dibasic lead phosphite. This composition served as a control to indicate the effectiveness of the present invention since lead orthosilicate is widely accepted as being essentially non-reactive with sensitive organic colorants.

Mixing and fluxing of these compositions was achieved as in Example 1. Portions of each composition were molded into sheets 0.070 inch in thickness in a hydraulic press at 320° F. for 20 minutes.

Reflectance values were obtained on these molded specimens using the tristimulus filters of a Hunter multipurpose reflectometer. Lower reflectance values are indicative of a more intense red color in the plastic composition, and, hence, of lower sensitivity of the colorant to the other materials present. The results of this study are given in Table II.

*Table II*

HUNTER REFLECTANCE VALUES OF MOLDED PIGMENTED VINYL COMPOSITIONS

| | Stabilizer | | |
|---|---|---|---|
| | Dibasic lead phosphite | Dibasic lead phosphite | Lead ortho silicate |
| Tristimulus filter | Lubricant or co-stabilizer | | |
| | Petroleum wax | Ba stearate | Petroleum wax |
| | *Percent* | *Percent* | *Percent* |
| Green | 51.4 | 47.9 | 50.7 |
| Amber | 64.8 | 61.7 | 62.0 |
| Blue | 56.0 | 51.4 | 55.3 |

EXAMPLE 3

100 parts of polyvinyl chloride resin were mixed with 50 parts of dioctyl phthalate plasticizer and various samples were prepared adding various basic lead salts and varying amounts of barium stearate as stabilizers. Samples were also prepared where barium stearate alone was employed as a stabilizer. Two sets of samples were made. In one set the total amount of stabilizer was maintained constant, the barium stearate being substituted for a portion of the basic lead stabilizer and, in the second group, the basic lead stabilizer was maintained constant and the barium stearate added to the basic lead salt. The results of heat stability tests conducted on these samples are indicated in Table III.

*Table III*

Effect of Barium Stearate on Heat Stability with Basic Lead Stabilizers

| Basic lead stabilizer (parts)[1] | Ba stearate | | Dibasic lead phosphite | Tribasic lead sulfate | Basic lead silicate-sulfate | Lead chloro-silicate | Tetrabasic lead fumarate | Dibasic lead phthalate |
|---|---|---|---|---|---|---|---|---|
| | Parts [1] | Percent [2] | | | | | | |
| 5.00 | 0. | 0 | Fair | Poor + | Poor + | Poor − | Fair | Poor +. |
| 4.95 | 0.05 | 1 | Fair + | Fair + | Fair + | Poor + | Good | Good −. |
| 4.875 | 0.125 | 2.5 | Good + | Good + | Good + | Fair + | Good + | Good. |
| 4.75 | 0.25 | 5 | Very good | Good + | Good + | Fair + | Very good − | Good. |
| 4.50 | 0.50 | 10 | Very good | Good + | Good + | Good − | Very good − | Good. |
| 4.00 | 1.00 | 20 | Fair + | Good | Good − | Fair + | Good + | Fair +. |
| 3.00 | 2.00 | 40 | Fair | Fair | Fair − | Poor − | Fair − | Poor. |
| 0 | 5.00 | 100 | Poor | Poor | Poor | Poor | Poor | Poor. |
| 5.00 | 0 | 0 | Fair | Poor + | Poor + | Poor − | Fair | Poor +. |
| 5.00 | 0.05 | 1 | Fair + | Fair + | Fair + | Poor + | Good | Good −. |
| 5.00 | 0.125 | 2.4 | Very good + | Good + | Good + | Fair + | Very good − | Good. |
| 5.00 | 0.25 | 4.8 | Very good + | Good + | Good + | Fair + | Very good − | Good. |
| 5.00 | 0.50 | 9 | Very good | Good + | Good + | Good − | Good + | Good. |
| 5.00 | 1.00 | 17 | Good + | Very good | Good + | Good − | Good − | Poor. |
| 5.00 | 2.00 | 29 | Fair + | Fair + | Fair + | Good − | Good − | Poor. |
| 0 | 5.00 | 100 | Poor | Poor | Poor | Poor | Poor | Poor. |

[1] Parts per 100 parts of polyvinyl-chloride resin (100 PVC, 50 DOP, stabilizer as shown).
[2] Percent of total stabilizer.

EXAMPLE 4

100 parts of polyvinyl chloride resin were mixed with 50 parts of dioctyl phthalate plasticizer and to this mixture was added either lead chlorosilicate or dibasic lead phthalate, barium stearate being substituted for a portion of the basic lead salt. The results of volume resistivity tests conducted on these samples is as shown in Table IV.

*Table IV*

EFFECT OF BARIUM STEARATE RATIO ON VOLUME RESISTIVITY

| Basic lead stabilizer, parts [1] | Barium stearate | | Volume resistivity at 70° C. | |
|---|---|---|---|---|
| | Parts [1] | Percent of stabilizer | Lead chlorosilicate, percent [2] | Diabasic lead phthalate, percent [3] |
| 5.00 | 0.00 | 0.0 | 100 | 100 |
| 4.95 | 0.05 | 1.0 | 120 | 110 |
| 4.875 | 0.125 | 2.5 | 125 | 115 |
| 4.75 | 0.250 | 5.0 | 130 | 130 |
| 4.50 | 0.50 | 10.0 | 160 | |
| 4.00 | 1.00 | 20.0 | 190 | 165 |
| 3.00 | 2.00 | 40.0 | 90 | 200 |
| 0.00 | 5.00 | 100.0 | 55 | 65 |

[1] Parts per 100 parts of resin in plastic, by weight. Formula: polyvinyl chloride resin 100, DOP 50, stabilizer 5 total.
[2] Actual value $4.5 \times 10^{12}$ ohm-cm.
[3] Actual value $2.9 \times 10^{12}$ ohm-cm.

EXAMPLE 5

100 parts of polyvinyl chloride resin were mixed with 50 parts of dioctyl phthalate plasticizer, and 5 parts of either tribasic lead sulfate or dibasic lead phosphite and barium stearate or 5 parts electrical grade clay, or both, as indicated in Table V, were added to the composition. Mixing and fluxing, preparation of the samples, and tests were conducted as in Example 1. The results of heat stability and electrical resistivity tests on these samples are given in the following table:

*Table V*

TRIBASIC LEAD SULFATE

| Sample | Percent Ba [1] stearate | Vol. resist., percent control | | Heat stability | | Remarks |
|---|---|---|---|---|---|---|
| | | No clay | Clay | No clay | Clay | |
| 1 | 0 | 100 | 100 | P | EP+ | Control |
| 2 | 10 | 190 | 130 | G+ | P+ | |

DIBASIC LEAD PHOSPHITE

| 1 | 0 | 100 | 100 | P+ | P | Control |
| 2 | 10 | 135 | 95 | G+ | G+ | |
| 3 | 20 | 125 | 110 | VG− | G+ | |

[1] In stabilizer blend.

EXAMPLE 6

100 parts of polyvinyl chloride resin were mixed with 50 parts of dioctyl phthalate plasticizer and 3 parts of lead chlorosilicate. The sample 1, 1% stearic acid was added to the composition, in sample 2 no addition was made, in sample 3, 15% stearic acid was added to the composition, and in samples 4 through 7, 0.5 part of the indicated barium salt, based on the weight of the resin, was added. These samples were tested in accordance with the procedure of Example 1 and the results of these tests were as follows:

*Table VI*

| Sample | Additive | Vol. resist., percent std. | Heat stability | Remarks |
|---|---|---|---|---|
| 1 | Stearic acid (1%) | 100 | VP+ | Lead chlorosilicate control. |
| 2 | None | 60 | VP− | |
| 3 | Stearic acid (15%) | 95 | VG | |
| 4 | Ba stearate | 190 | G | |
| 5 | Ba p-t-butylbenz | 125 | F+ | Early yellowing. |
| 6 | Ba borate | 75 | EP | |
| 7 | Ba phosphate | 95 | EP | |

EXAMPLE 7

100 parts of polyvinyl chloride resin were mixed with 50 parts of dioctyl phthalate plasticizer and 3 parts of dibasic lead phosphite. Sample 1 was prepared without barium additive and samples 2 through 7 contain .5 part of the indicated barium additive. These samples were tested in accordance with the procedure of Example 1 and the results of these tests were as follows:

*Table VII*

| Sample | Additive | Number of C atoms | Vol. resist., percent std. | Heat stability | Remarks |
|---|---|---|---|---|---|
| 1 | None | | 100 | G− | |
| 2 | Ba stearate control | 18 | 130 | VG | |
| 3 | Ba stearate | 18 | 130 | VG− | |
| 4 | Ba laurate | 12 | 95 | VG | |
| 5 | Ba caprate | 10 | 85 | VG− | Sl. longer time to fuse. |
| 6 | Ba behenate | 22 | 140 | VG | |
| 7 | Ba stearate (no dibasic lead phosphite). | | 80 | F | |

EXAMPLE 8

100 parts of polyvinyl chloride resin were mixed with 50 parts of dioctyl phthalate plasticizer and samples were prepared with lead chlorosilicate, barium salt and a combination of lead chlorosilicate and barium salt, in varying amounts as indicated in the following table. These samples were prepared and tested in accordance with the procedure of Example 1. The results of these tests are as follows:

*Table VIII*

EFFECT OF BARIUM SALTS WITH LEAD CHLOROSILICATE

| | 1 | 2 | 3 | 4 | 5 | 6 | 7 |
|---|---|---|---|---|---|---|---|
| Lead chlorosilicate | 3.5 | | | | 3.0 | 3.0 | 3.0 |
| Barium caprate | | 1.0 | | | 0.5 | | |
| Barium stearate | | | 1.0 | | | 0.5 | |
| Barium behenate | | | | 1.0 | | | 0.5 |
| Volume resistivity at 70° F. in $10^{12}$ ohm-cm. | 3.3 | 5.5 | 5.5 | 4.4 | 6.7 | 6.8 | 6.7 |
| Heat stability: | | | | | | | |
| Rating | V. Poor | V. Poor | V. Poor | V. Poor | Fair | Fair | Fair |
| Color (min./375° F.): | | | | | | | |
| 10 min | Tan | Orange | Dk. yellow | Dk. yellow | Lt. cream | Lt. cream | Lt. cream. |
| 15 min | Lt. Brown | Amber | Lt. amber | Lt. amber | Cream | Cream | Cream. |
| 20 min | Brown | Dk. amber | Dk. amber | Dk. amber | V. lt. buff | V. lt. buff | V. lt. buff. |

By the terms "vinyl halide resin" or "polymer" is meant to include the various vinyl resin compounds and combinations known to the art, including vinyl halides, such as polyvinyl chloride; vinyl resins produced by copolymerizing vinyl halides with vinyl acetate or other vinyl monomer; vinyl resins produced by copolymerization of vinyl halide with an acrylic compound such as ethyl or methyl methacrylate; and vinylidene halides and vinyl-vinylidene halide copolymers. A variety of plasticizer colorants and other modifying agents may be incorporated in the stabilized compositions described above, as will be readily understood by those skilled in the art. The stabilizers of this invention are, to a substantially improved degree, unreactive with such materials.

While illustrative forms of the invention have been disclosed in considerable detail, it will be understood that various changes may be made in the construction and arrangement of the several parts without departing from the general principles and scope of the invention as defined by the appended claims.

What is claimed is:

1. A polyvinyl halide polymer composition containing, as stabilizer, a composition comprising a basic lead salt of an oxygen-containing acid, and a barium salt of a fatty acid containing from 6 to 20 carbon atoms, said basic lead salt being selected from the group consisting of basic lead sulfate, basic lead phosphite, basic lead silicate, basic lead carbonate, basic lead silicate-sulfate, basic lead chloride-lead silicate complex, basic lead fumarate and basic lead phthalate, said barium salt component of said stabilizer comprising not substantially less than 1% and not substantially more than 40% by weight of said stabilizer based on the lead oxide content of said basic lead salt.

2. A polyvinyl halide polymer composition as recited in claim 13, said stabilizer comprising not substantially less than 0.05% and not substantially more than 20% by weight of the polymer in said composition.

3. A polyvinyl halide polymer composition as recited in claim 1, said stabilizer comprising not substantially less than 2% and not substantially more than 7% by weight of the polymer in said composition.

4. A polyvinyl halide polymer composition as recited in claim 1, said basic lead salt being a basic sulfate.

5. A polyvinyl halide polymer composition as recited in claim 1, said basic lead salt being a basic phosphite.

6. A polyvinyl halide polymer composition as recited in claim 1, said basic lead salt being a basic silicate.

7. A polyvinyl halide polymer composition as recited in claim 1, said basic lead salt being a basic carbonate.

8. A polyvinyl halide polymer composition as recited in claim 1, said basic lead salt being a basic lead chloride-lead silicate complex.

9. A stabilizing agent for polyvinyl halide polymers which consists essentially of a basic lead salt of an oxygen-containing acid and a barium salt of a fatty acid containing from 6 to 20 carbon atoms, said basic lead salt being selected from the group consisting of basic lead sulfate, basic lead phosphite, basic lead silicate, basic lead carbonate, basic lead silicate-sulfate, basic lead chloride-lead silicate complex, basic lead fumarate and basic lead phthalate, said barium salt component comprising not substantially less than 1% and not substantially more than 40% by weight of said stabilizer based on the lead oxide content of said basic lead salt.

10. A stabilizing agent for polyvinyl halide polymers as recited in claim 9, said barium salt being barium stearate.

11. A stabilizing agent for polyvinyl halide polymers as recited in claim 9, said basic lead salt being basic lead sulfate.

12. A stabilizing agent for polyvinyl halide polymers as recited in claim 9, said basic lead salt being basic lead phosphite.

13. A stabilizing agent for polyvinyl halide polymers as recited in claim 9, said basic lead salt being basic lead phthalate.

14. A stabilizing agent for polyvinyl halide polymers as recited in claim 9, said basic lead salt being basic lead silicate-sulfate.

15. A stabilizing agent for polyvinyl halide polymers as recited in claim 9, said basic lead salt being basic lead chloride-lead silicate complex.

References Cited in the file of this patent

UNITED STATES PATENTS

| | | |
|---|---|---|
| 2,467,550 | Fletcher et al. | Apr. 19, 1949 |
| 2,564,646 | Leistner et al. | Aug. 14, 1951 |
| 2,711,401 | Lally | June 21, 1955 |
| 2,752,319 | Lipke | June 26, 1956 |
| 2,985,617 | Salyer et al. | May 23, 1961 |

UNITED STATES PATENT OFFICE
CERTIFICATE OF CORRECTION

Patent No. 3,106,539                        October 8, 1963

John G. Hendricks et al.

It is hereby certified that error appears in the above numbered patent requiring correction and that the said Letters Patent should read as corrected below.

Column 2, line 10, for "in", first occurrence, read -- is --; column 6, line 4, for "The" read -- In --; column 7, line 35, for the claim reference numeral "13" read -- 1 --.

Signed and sealed this 14th day of April 1964.

(SEAL)
Attest:

ERNEST W. SWIDER                          EDWARD J. BRENNER

Attesting Officer                            Commissioner of Patents